United States Patent Office 3,183,173
Patented May 11, 1965

3,183,173
TEST COMPOSITION FOR DETECTING
HYDROGEN PEROXIDE
Paul William Oakes, Elkhart, Ind., assignor to Miles Laboratories, Inc., Elkhart, Ind., a corporation of Indiana
No Drawing. Filed June 10, 1963, Ser. No. 286,460
9 Claims. (Cl. 195—103.5)

This invention relates to new test compositions and test indicators. Generally it is concerned with both a test composition for the qualitative detection and quantitative determination of hydrogen peroxide and a test indicator which this compositon is embodied. More particularly this invention relates to compositions which effect a visible color change in the presence of hydrogen peroxide.

The detection of hydrogen peroxide has importance as a qualitative and quantitative test both clinically and commercially in determining the presence of either hydrogen peroxide itself or a substance which, upon reaction with another substance, produces hydrogen peroxide. For example, many oxidative enzymes act upon suitable substrates producing a detectable amount of hydrogen peroxide. By quantitative determination of this hydrogen peroxide the quantity of substrate present can be determined. The detection of hydrogen peroxide and ultimately the substance which is degraded to produce hydrogen peroxide is of great importance in medicine in the diagnosing of diseases from abnormal metabolism of sugars such as glucose and galactose, purines, and proteins, in obstetrical practice in determining favorable conditions for conception, as well as in industry and in air pollution determination.

In the treatment and control of diabetes, a quick, reliable, accurate and simple method of detection of glucose levels in suspect urine is of great importance. Since glucose, in the presence of glucose oxidase, is converted to gluconic acid and hydrogen peroxide, the accurate measurement of the hydrogen peroxide thus formed serves also to determine the presence and the amount of glucose.

Galactosemia is a congenital abnormality of carbohydrate metabolism resulting from the body's inability to convert galactose to glucose due to the absence of the enzyme, UDP-galactose-uridyltransferase. Previously, in order to diagnose galactosemia, galactose levels in blood or urine were determined by Benedict's qualitative method and other specialized and cumbersome techniques.

In another instance concerning the diagnosis of an abnormal metabolic condition, the presence of uric acid in blood serum is noted as an end product of purine metabolism. In most mammals uric acid is converted to readily soluble allantoin by the enzyme uricase or urate oxidase. However, humans lack this enzyme and must dispose of uric acid either through gastric juice, bile, saliva, sweat or through the kidneys. In healthy humans, these disposal routes are sufficient, but in conditions involving deranged purine metabolism an accumulation of uric acid in the bloodstream results. Above normal levels of uric acid acid indicate conditions which are characterized by renal insufficiency (nephritis), metabolic disturbances (gout) or massive and rapid cell nuclei destruction (leukemia). Subnormal levels of uric acid, on the other hand, indicate possible yellow and acute liver atrophy or pernicious anemia. The present methods of testing for these conditions utilize urea cyanide as a test substance, a poison which not only requires refrigeration but leads to possible sources of error because of poor stability.

Other abnormalities resulting in increased amino acid levels are detected by examination of blood serum of galactosemic infants, and are further evidenced as proteinuria in eclampsia and aluminuria in cases of yellow fever atrophy.

Gynecology is another area where this diagnostic composition and indicator may be used. Gynecological studies have shown that glucose is present in periodic cervical area secretions coinciding with ovulation. For this reason test materials impregnated with glucose sensitive color forming indicators have been used to determine the period of ovulation with considerable accuracy. However, in most such formulations the color forming indicator substances are either of a carcinogenic nature, or, if placed in contact with sensitive cervical mucous membranes, may be unduly irritating. They are, therefore, undesirable for this purpose.

In the dairy industry, principally in the manufacturing and processing of cheese, hydrogen peroxide is used to destroy unwanted bacteria, thereby replacing the bacterial heating step, the use of which tends to destroy the desired curd. Subsequent to this peroxidation step, peroxidase is used to eliminate the excess hydrogen peroxide. This creates the necesstiy for an accurate, reliable, inexpensive and rapid-acting test to determine the residual amount of hydrogen peroxide which, when present in excessive amounts, imparts an undesirable bitter taste to the cheese products.

It is well known to those skilled in the art that aromatic amines, for example, o-tolidine, benzidine, 2,7-diaminofluorene and phenols, e.g., 3,4-dihydroxyphenylalanine and guaiacol are used as oxidation-reduction indicators. These indicators, however, are susceptible to degradation in the presence of light and oxygen. Further, when used as indicators in enzyme systems which generate hydrogen peroxide, they exert inhibiting and retarding effects on the enzymes involved. Aromatic amines such as o-tolidine, benzidine, and 2,7-diaminofluorene are not only undesirable because they are insoluble in aqueous solutions and soluble only in strong acids, but because they are also suspected of being carcinogenic in nature. In enzyme systems which are effective at pH 4 to pH 9, these aromatic amines precipitate as the free bases and are more susceptible in this form to deterioration by light and oxygen.

Prior to the discovery of the present invention, the determination of hydrogen peroxide was effected by methods which were cumbersome, time-consuming, dangerous, exacting, generally difficult and, in many instances, unreliable. The many attempts to overcome the aforementioned difficulties and other disadvantages have not been successful when executed commercially on an industrial scale or clinically.

Accordingly, is is an object of this invention to provide a reliable inexpensive, accurate, and safe test composition for hydrogen peroxide determination.

It is another object of this invention to provide an indicator for hydrogen peroxide producing enzyme systems which does not retard or inhibit the enzyme system.

It is yet a further object to provide a light and oxygen stable, water soluble indicator embodied in a diagnostic composition.

It is further an object to provide a diagnostic composition and indicator which is easily adaptable to mass screening for the detection of certain metabolic abnormalities.

It has been known that when hydrogen peroxide reacts with an iodide, such as potassium iodide, sodium iodide, ammonium iodide or other water soluble iodides, free iodine is liberated. The addition of small amounts of metal ions such as copper, cobalt, iron, nickel or molybdenum ions in the form of their water-soluble salts catalyzes the reaction so that iodine is rapidly produced as the hydrogen peroxide reacts with the iodide ion.

It is also well known that glucose, for example, in the presence of an enzyme possessing glucose oxidase activity, is converted to gluconic acid producing hydrogen peroxide. Under these circumstances detection of the hydrogen peroxide serves as a measure of the glucose present in the sample being tested.

I have found a novel and highly desirable test composition for the detection of hydrogen peroxide. This composition comprises an iodide salt, a metal salt which catalyzes the oxidation of said iodide salt by hydrogen peroxide and a high molecular weight polymeric substance selected from the group consisting of polyvinyl alcohol and polyvinyl pyrrolidone.

Any water soluble iodide salt such as potassium iodide may be used with, for example, molybdenum in the form of its water soluble salts such as its alkali metal salts, for example potassium molybdate or sodium molybdate, or its ammonium salt. The addition of a high molecular weight polymeric substance such as polyvinyl alcohol or polyvinyl pyrrolidone to such a system produces in the presence of hydrogen peroxide an immediate color which is believed to be the result of the interaction of the polymeric high molecular weight substance and the resulting reaction product of the iodide and hydrogen peroxide. The color varies in intensity, depending upon the amount of hydrogen peroxide present and thus provides a quantitative measure of the hydrogen peroxide. The polymeric high molecular weight substance such as polyvinyl alcohol, for example, is unaffected by light and oxygen and is a completely stable material. Moreover, from its structure its color forming properties are completely unexpected. Although the exact mechanism is unknown, such color formation is presumably accomplished by a complexing with the iodine formed from the interaction of hydrogen peroxide and iodide. These polymers are water soluble, forming clear solutions which readily lend themselves to test purposes.

The following is included to show by exemplification, rather than limitation, the inventive concept described herein. It will be clear to those skilled in the art that various modifications may be made within the ambit of the invention.

EXAMPLE 1

Glucose test

The following ingredients were mixed to form a solution useful for the detection and measurement of glucose:

Polyvinyl alcohol (10% in water) _____ml__ 25
Phosphate buffer (pH 6.5) _____ml__ 20
Denatured (2B) alcohol _____ml__ 25
Potassium iodide _____g__ 1
Sodium molybdate _____g__ 1
Glucose oxidase (15,000 Sarett [1] u./gram) ___g__ 1
Water _____ml__ 20

[1] The activity of a Sarett unit of glucose oxidase is that amount which will cause the uptake of 10 ml. of oxygen per minute, under specified conditions and with a designated substrate. Scott, J. Ag. Food Chem. 1, 727 (1953).

This solution was prepared by placing the 25 ml. of polyvinyl alcohol into a 150 ml. beaker. To this was added 1 ml. of phosphate buffer and 25 ml. of denatured alcohol. The remaining 19 ml. of phosphate buffer was added to the solution. One gram of potassium iodide and one gram of sodium molybdate were then dissolved in 10 ml. of water and added to the solution. One gram of glucose oxidase was then dissolved in 10 ml. of water and added.

Filter paper cut into strips ¼ inch in width and 4 inches in length were dipped into the above impregnating solution so that one-half inch of the strip at one end was completely impregnated. These strips were then dried in a forced draft oven at 100° C. for 19 minutes.

The dried, impregnated paper strips were dipped into glucose supplemented human urines having glucose concentrations of 0.1%, 0.25%, 0.5%, 1% and 2% as well as a control urine containing no glucose.

The paper strips dipped into each glucose supplemented urine immediately produced a pink color. Within one minute after dipping, the colors corresponding to the various concentrations of glucose were as shown in Table 1 below.

TABLE 1

| Concentration of glucose in urine (percent): | Color |
| --- | --- |
| 0.0 | Colorless. |
| 0.1 | Light reddish-brown. |
| 0.25 | Medium reddish-brown. |
| 0.5 | Dark reddish-brown. |
| 1.0 | Brown. |
| 2.0 | Black. |

These test strips were found to be sensitive to solutions containing as little as 0.0008% glucose and accurate at a pH of from about pH 4.0 to pH 9.0.

EXAMPLE 2

Hydrogen peroxide test

The following ingredients were used to form a hydrogen peroxide test solution:

Polyvinyl alcohol (10% in water) _____ml__ 6.25
Phosphate buffer (pH 6.5) _____ml__ 5.0
Denatured (2B) alcohol _____ml__ 6.25
Potassium iodide _____g__ 0.25
Sodium molybdate _____g__ 0.25
Water _____ml__ 5.0

To the polyvinyl alcohol was added 0.25 ml. of buffer. The denatured alcohol was added and then the remainder of the buffer. The potassium iodide and sodium molybdate were dissolved in 5.0 ml. of water and added to the solution.

The preparation of test strips was accomplished in the same manner as in Example 1. Upon testing, these strips were shown to be sensitive to solutions containing as little as five parts per million of hydrogen peroxide.

EXAMPLE 3

Galactose test

The following ingredients were used to form a solution useful for the detection and measurement of galactose.

Polyvinyl alcohol (10% in water) _____ml__ 6.25
Phosphate buffer (pH 6.5) _____ml__ 5.0
Denatured (2B) alcohol _____ml__ 6.25
Potassium iodide _____g__ 0.25
Sodium molybdate _____g__ 0.25
Galactose oxidase (29,000 Sarett u./gram) ___g__ 0.25
Water _____ml__ 5.0

To the polyvinyl alcohol was added 0.25 ml. of buffer. The denatured alcohol was added and then the rest of the buffer. The potassium iodide and sodium molybdate were dissolved in 2.5 ml. of water. The 250 mg. of galactose oxidase enzyme was then dissolved in 2.5 ml. of water and added to the above solution.

Precut strips ¼ inch wide and 4 inches long were dipped into the above solution and dried at 50° C. for 18 minutes. These reagent strips were then used to test samples of galactose supplemented urines.

In these galactose tests the results were identical to those observed in the glucose tests except that the times required for the distinguishing colors to appear were longer in this instance. The results are shown in Table 2 below.

TABLE 2

Concentration of galactose
in urine (percent):          Color
0.0  ..........................  Colorless.
0.1  ..........................  Light reddish-brown.
0.25 ..........................  Medium reddish-brown.
0.5  ..........................  Dark reddish-brown.
1.0  ..........................  Brown.
2.0  ..........................  Black.

EXAMPLE 4

*Glucose test*

The following ingredients were mixed to form a solution useful for the detection and measurement of glucose:

Polyvinyl pyrrolidone (10% in water) ........ml... 25
Phosphate buffer (pH 6.5) ................ml... 20
Denatured (2B) alcohol ...................ml... 25
Potassium iodide .........................g.... 1
Sodium molybdate .........................g.... 1
Glucose oxidase (15,000 Sarett u./gram) ..g.... 1
Water ....................................ml... 20

The solution was prepared as in Example 1 above. The procedure for preparation of test strips was similarly followed.

The dried, impregnated paper strips were dipped into glucose supplemented human urines having glucose concentrations of 0.1%, 0.25%, 0.5%, 1% and 2% as well as a control urine containing no glucose.

The paper strips dipped into each glucose supplemented urine produced a faint yellow color. Within one minute after dipping, the colors corresponding to the various concentrations of glucose were as shown in Table 3.

TABLE 3

Concentration of glucose
in urine (percent):        Color
0.0  ........................  Colorless.
0.1  ........................  Faint yellow.
0.25 ........................  Yellow.
0.5  ........................  Deep yellow.
1.0  ........................  Pale orange.
2.0  ........................  Orange brown.

The invention further contemplates the formulation of reagent compositions for the detection of other substances which are capable of causing the production of hydrogen peroxide such as uric acid using urate oxidase and amino acids using D-amino acid oxidase. Such reagent compositions utilize the respective oxidative enzyme capable of effecting production of hydrogen peroxide when acting upon its particular substrate.

Slight modifications in the formulation may be made as required. For example, when testing for an enzyme having urate oxidase activity or for one having amino acid oxidase activity the reagents containing these respective enzymes are optimally buffered at a pH in the range of from about pH 8 to about pH 9.

It will also be understood that other bibulous materials, such as small wooden sticks, powders or tablets may be employed in the practice of this invention.

In those instances where a test powder or tablet is desirable, the reagent composition may be spray dried, lyophilized or mixed with various non-inhibiting inert fillers and excipients so as to produce a composition suitable for tableting.

In using the spray dried or lyophilized powder, the test solution is reconstituted upon testing.

In using a tablet, the test may be performed by applying the material to be tested to the tablet, for instance, by placing a drop or two of suspect fluid on the face of the tablet and observing whether or not color formation occurs.

In summary, this invention relates to novel diagnostic compositions for the quantitative determination of hydrogen peroxide in systems which contain hydrogen peroxide or are capable of producing hydrogen peroxide. These compositions are devoid of any color indicator as such and rely upon the unique properties of a high molecular weight polymeric substance such as polyvinyl alcohol or polyvinyl pyrrolidone which forms a color complex with the product formed by the interaction of an iodide salt and hydrogen peroxide in the presence of a molybdate salt. Since these compositions function in any system which is capable of producing hydrogen peroxide, they may be useful in those enzyme systems in which hydrogen peroxide is produced from the interaction of a specific enzyme oxidase with its substrate. By incorporating the diagnostic composition on bibulous carriers, in solutions, in spray dried or lyophilized powders or in any other suitable embodiment, a convenient, rapid, inexpensive and sensitive test for that enzyme may be produced.

Although the present invention has been described in conjunction with preferred embodiments, exemplary modifications and variations may be resorted to without departing from the scope and spirit of the invention as will be readily understood by those skilled in the art. Such modifications and variations are considered within the purview and scope of the present invention and appended claims.

What is claimed is:

1. A color forming test composition for detecting hydrogen peroxide consisting of an iodide salt selected from the group consisting of potassium iodide, sodium iodide and ammonium iodide, a molybdenum salt selected from the group consisting of potassium molybdate, sodium molybdate and ammonium molybdate, and a polymeric substance selected from the group consisting of polyvinyl alcohol and polyvinyl pyrrolidone, said polymeric substance being the only color indicator present.

2. A color forming test composition for detecting a substrate for an enzyme consisting of an enzyme which catalyzes the oxidation of a substrate to produce hydrogen peroxide upon oxidation thereof, an iodide salt selected from the group consisting of potassium iodide, sodium iodide and ammonium iodide, a molybdenum salt selected from the group consisting of potassium molybdate, sodium molybdate and ammonium molybdate, and a polymeric substance selected from the group consisting of polyvinyl alcohol and polyvinyl pyrrolidone and a buffer which is effective to maintain the pH within a range in which said enzyme is active, said polymeric substance being the only color indicator present.

3. A composition as described in claim 2 wherein the enzyme is a member selected from the group consisting of glucose oxidase, urate oxidase, D-amino acid oxidase and galactose oxidase.

4. A color forming test composition for detecting galactose which consists of an enzyme possessing galactose oxidase activity, potassium iodide, sodium molybdate, polyvinyl alcohol, and a buffer to maintain the pH between about pH 4.0 to pH 9.0, said polyvinyl alcohol being the only color indicator present.

5. A color forming test composition for detecting glucose which consists of an enzyme having glucose oxidase activity, potassium iodide, sodium molybdate, polyvinyl alcohol and a buffer to maintain the pH between about pH 4.0 to pH 9.0, said polyvinyl alcohol being the only color indicator present.

6. A composition as described in claim 1 in the form of a lyophilized powder.

7. A test device comprising a bibulous material upon which is impregnated the composition of claim 1.

8. A color forming test composition for detecting an amino acid consisting of an enzyme having D-amino acid oxidase activity, potassium iodide, sodium molybdate, polyvinyl alcohol and a buffer to maintain the pH between about pH 8.0 to pH 9.0, said polyvinyl alcohol being the only color indicator present.

9. A color forming test composition for detecting uric acid consisting of an enzyme possessing urate oxidase activity, potassium iodide, sodium molybdate, polyvinyl alcohol and a buffer to maintain the pH between about pH 8.0 to pH 9.0, said polyvinyl alcohol being the only color indicator present.

References Cited by the Examiner

UNITED STATES PATENTS

| 2,981,606 | 4/61 | Keston | 195—103.5 |
| 3,016,292 | 1/62 | Bauer | 195—103.5 |
| 3,050,373 | 8/62 | Collins | 195—103.5 |
| 3,095,307 | 6/63 | Scott et al. | 195—103.5 |
| 3,099,605 | 7/63 | Free | 195—103.5 |

A. LOUIS MONACELL, *Primary Examiner.*